(12) United States Patent
Heyek

(10) Patent No.: US 6,238,559 B1
(45) Date of Patent: May 29, 2001

(54) DEVICE FOR SEPARATING FLOATING LAYERS IN A LIQUID BASIN

(75) Inventor: Kurt Heyek, Graz (AT)

(73) Assignee: Tschuda GmbH & Co., KG, Graz (AT)

( * ) Notice: Subject to any disclaimer, the term of this patent is extended or adjusted under 35 U.S.C. 154(b) by 0 days.

(21) Appl. No.: 09/360,357

(22) Filed: Jul. 22, 1999

Related U.S. Application Data

(63) Continuation of application No. PCT/AT98/00013, filed on Jan. 23, 1998.

(30) Foreign Application Priority Data

Jan. 23, 1997 (AT) .......................................... 96/97

(51) Int. Cl.[7] .................................................. B01D 21/06
(52) U.S. Cl. ...................... 210/242.1; 210/524; 210/525; 210/528; 210/540
(58) Field of Search .................. 210/104, 242.1, 210/242.3, 523, 524, 525, 526, 528, 538, 540

(56) References Cited

U.S. PATENT DOCUMENTS

| | | | |
|---|---|---|---|
| 2,249,049 | * | 7/1941 | Sayers .................................. 210/525 |
| 2,778,500 | * | 1/1957 | Fuller ................................ 210/242.3 |
| 3,447,683 | | 6/1969 | Luce . |
| 3,709,357 | | 1/1973 | Brown . |
| 4,151,081 | * | 4/1979 | Balli et al. ......................... 210/242.3 |
| 4,196,087 | | 4/1980 | Gordon . |
| 4,784,764 | | 11/1988 | Kleinschnittger . |
| 4,808,305 | * | 2/1989 | Arnold .............................. 210/242.1 |
| 4,931,175 | * | 6/1990 | Krofta .................................. 210/525 |
| 5,167,815 | * | 12/1992 | Bachmann et al. .................. 210/540 |
| 5,242,600 | | 9/1993 | Meylor . |
| 5,693,218 | * | 12/1997 | Yamamoto et al. .............. 210/242.3 |
| 5,948,277 | * | 9/1999 | Frankenberger ..................... 210/525 |

FOREIGN PATENT DOCUMENTS

| | | |
|---|---|---|
| 0815912 | 1/1998 | (EP) . |
| WO 9323334 | 11/1988 | (WO) . |
| WO 9201516 | 2/1992 | (WO) . |

* cited by examiner

*Primary Examiner*—Christopher Upton
(74) *Attorney, Agent, or Firm*—Henry M. Feiereisen; Ursula B. Day

(57) ABSTRACT

A device is disclosed for separating a floating layer mass, such as mud, foam and the like, from a liquid which resides in a liquid basin, e.g., a settling basin, and carries the floating layer. The device includes a transport device which moves the floating layer to a transport discharge region. The transport device is formed of at least one displacement body (3) which is driven by a drive unit (9) and moves the floating layer on the liquid surface towards the transport discharge region. The displacement body may be provided with a helical surface (4) which extends along the longitudinal axis of the displacement body.

30 Claims, 7 Drawing Sheets

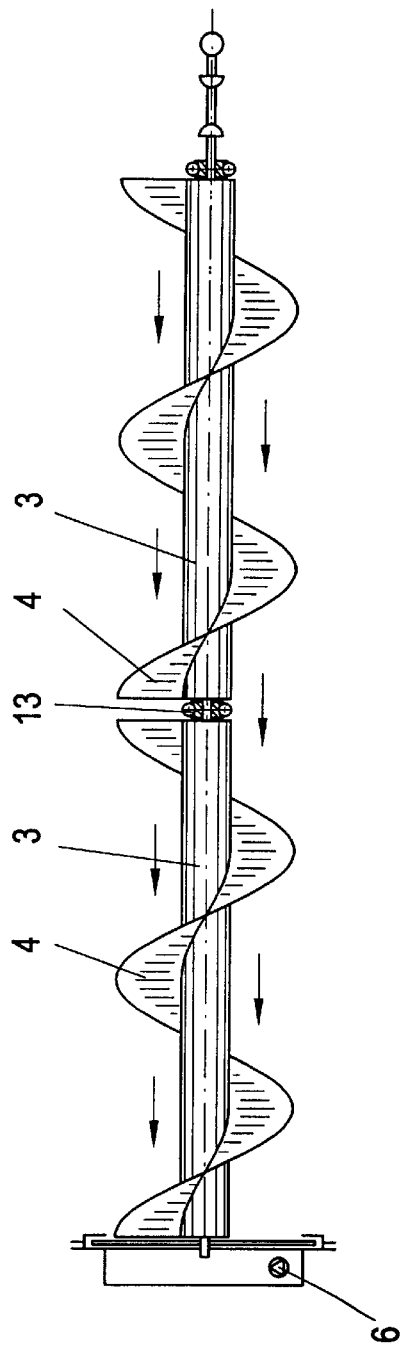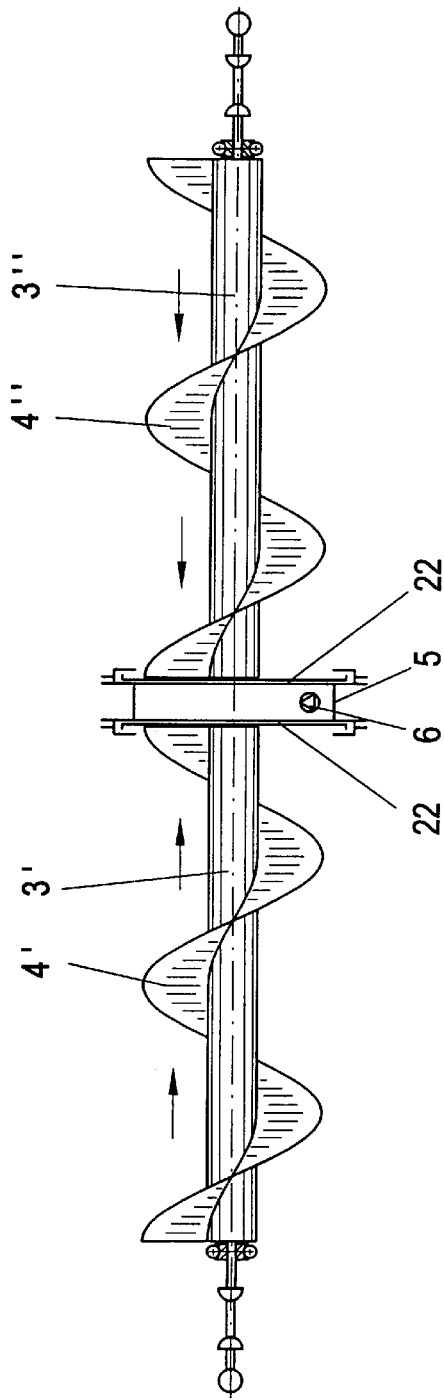

FIG. 7
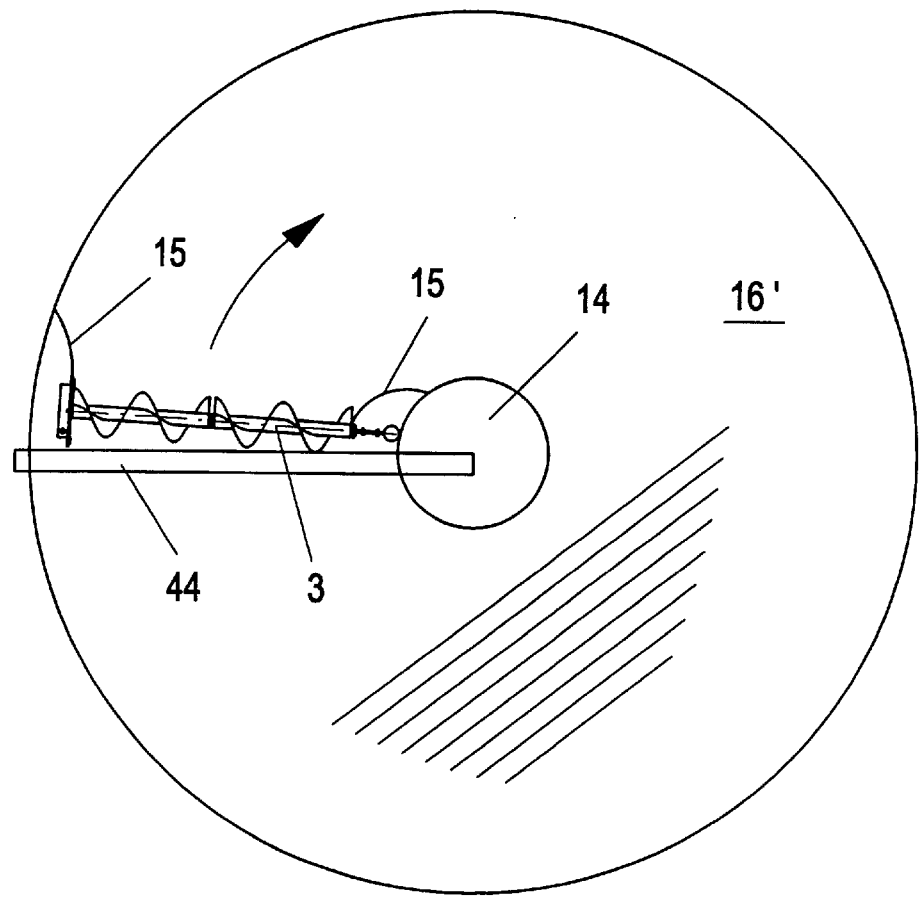
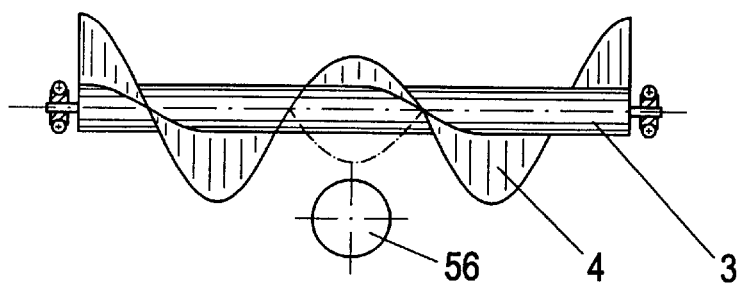
FIG. 9
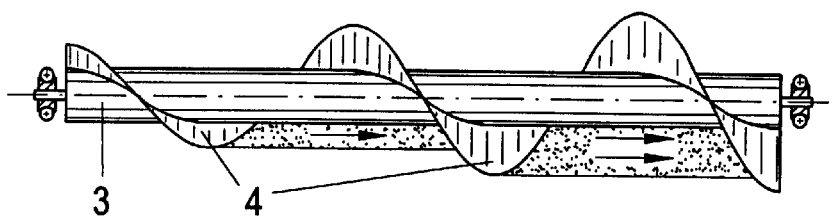
FIG. 10

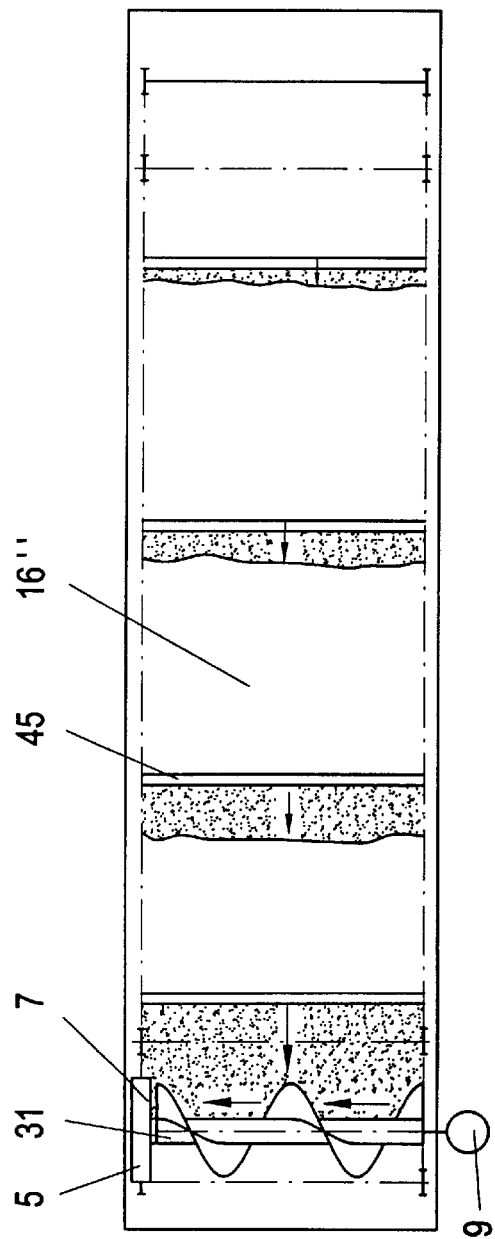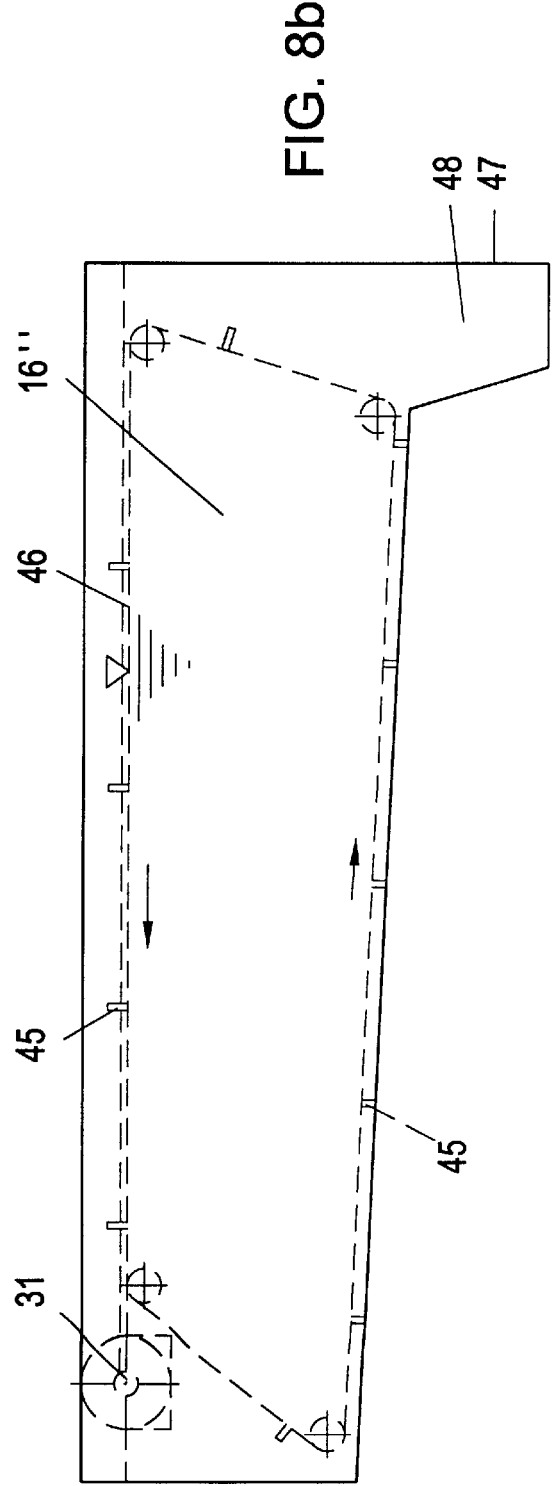

DEVICE FOR SEPARATING FLOATING LAYERS IN A LIQUID BASIN

CROSS-REFERENCES TO RELATED APPLICATIONS

This application is a continuation of prior filed copending PCT International application no. PCT/AT98/00013, filed Jan. 23, 1998, and claims the priority of Austrian Patent Application, Serial No. A 96/97, filed Jan. 23, 1997, the subject matter of which is incorporated herein by reference.

BACKGROUND OF THE INVENTION

The present invention relates to a device for separating floating layers, e.g., mud, foam and the like, from a liquid residing in a liquid basin, e.g., a settling basin, and carrying the floating layer, wherein the device includes a transport device which moves the floating layer to a transport discharge region.

Devices of the aforedescribed type are used wherever a medium, such as mud or foam, that floats on a liquid is to be separated from the liquid. Most frequently separated or removed is floating mud produced in final sedimentation tanks or mass separation facilities. Floating foam can collect in the form of a floating layer and reach a height on the surface of the liquid of close to 10 cm. With layers of this thickness, it is particularly important that the discharge overflow edge remains very precisely adjusted relative to the liquid level, so that the mixture consisting of the floating layer and the liquid can be withdrawn without noticeably stirring the liquid remaining in the final sedimentation tank. Otherwise, the floating layer may not properly separate.

Processes applied hitherto in the field of sewage treatment to solve this problem have failed and produced separation of poor quality. Moreover, in most situations the separation process has to be supervised so that the facilities operate properly. This results in relatively high costs and a rather low efficiency.

For example, WO-A-92/01516 describes a device for separating floating mud and wastewater in a closed container which has a lower inlet for the wastewater and an outlet with an overflow pipe which can be used to adjust the level in the wastewater container. A worm conveyor is arranged in the upper region of the container. One end of the worm conveyor is connected through a drive shaft to a stationary drive unit, while the other end is connected to a discharge cone for carrying the mud away with an upwardly slope. Other embodiments are depicted wherein the worm conveyor for transporting the mud is sloped upwardly. The changes in the liquid level are adjusted via the overflow pipe, while the worm conveyor remains in a fixed position with respect to the housing. In practice, it is difficult to maintain a constant liquid level wherein the overflow pipe is at a constant height due to the sluggish response of the system. Even if the contact depth of the worm conveyor changes only during a brief period, the floating layer and the liquid may be inadvertently stirred or mixed. Many applications operate advantageously with a constant feed ratio of mud to liquid which can be adjusted from turbid to diluted. This is difficult to implement if the worm conveyers are installed in a fixed position and the liquid level changes constantly. Moreover, the device becomes more susceptible to malfunction.

WO-A-95/23334 describes a device for separating floating foam wherein a cylindrical frame on which honeycomb-shaped lamellae are disposed, is moved inside a basin. The lamellae subdivide the contents of the basin into separate liquid columns which are sealed off from each other. In this way, the individual lamella channels are not adversely affected by the turbulence produced by the moving device. The liquid level is located slightly above the upper edge of the lamella arrangement, so that the floating foam is entrained when the lamellae rotate and is thereby transported into a mud collection device. The mud collection device has a blade and a worm conveyor which moves the stripped-off floating mass in an axial direction to an overflow edge and from there to a collection line. Because the worm conveyor is stationary with respect to the basin, the quality of the separation again strongly depends on the liquid level in the basin. It is difficult to prevent clarified water and floating foam from intermixing inadvertently.

U.S. Pat. No. 3,709,357 shows an arrangement for removing a floating oil layer from a water surface. A flexible worm conveyor which is designed to be lighter than water and thus floats on water, extends between two boats. The drive motor located on one of the boats drives the flexible worm conveyor rotates and thereby moves the oil mass to a hose entrance port. The floating worm conveyor is constructed from twisted cable strands which retain the conveyor blades around a center strand in their respective position. However, removing an oil layer floating on the water surface from seawater can hardly be compared with the tasks encountered in sewage treatment applications. First, a settling basin presents spatial conditions which are entirely different from those of the open sea, and secondly, a freely expanding oil layer behaves very differently from the floating layer masses which may be present in a final sedimentation tank and can have a height of up to 10 cm. The cable assembly illustrated in this patent cannot be applied to the transport of floating mud, since the fiber fraction and the solid fraction of the floating layers would immediately adhere to the large and rough surface of the cable assembly, thereby clogging the cable assembly and preventing further transport. Moreover, mud would also adhere to and accumulate at the cable assembly in the radial direction, thereby impeding the axial transport effect of the screws. The arrangement illustrated in U.S. Pat. No. 3,709,357 for transporting floating substances is therefore directed exclusively to a liquid which—as shown in FIG. 2 of the referenced patent—is pumped through a hose section into a discharge pipe. It is not feasible to apply such removal process to a final sedimentation tank.

U.S. Pat. No. 4,196,087 discloses a floating system for removing liquid surface layers. A central collection container for the liquid is surrounded with a float-like arrangement which drives the entire unit. Lateral inlets are provided for receiving floating liquids and/or contaminants. Worm conveyers surround the collection float, ext ending radially away therefrom. The worm conveyers consists of buoyant cylinders having two helical surfaces arranged thereon, with one end of each cylinder coupled to a drive unit producing a cylinder rotation. The worm conveyers can be used to transport the floating liquids to the collection inlets, from where the liquids are transported by another system consisting of counter-rotating helical surfaces and across a ramp into the collection tank. The worm conveyers are driven from a floating location. They are, however, mostly located beneath the liquid surface, making them unsuitable for transporting a floating layer mass without stirring the liquid. This "offshore" system does not form a combined catchment and transport system, but merely a transport system with upwardly sloping discharge elements.

U.S. Pat. No. 3,447,683 discloses a device for separating contaminants floating on a liquid surface, with the device consisting of two communicating tanks. The floating layer is driven by a worm conveyor from a larger tank into the smaller tank. A dense floating layer, which improves the separation process due to the differences in density and the connection via the communicating tanks, is thereby produced in the smaller tank. The separation of the floating layer is relatively imprecise due to the stationary arrangement of the worm conveyor.

U.S. Pat. No. 4,784,764 discloses an arrangement for flocculating substances from a suspension. The flocculated substances are drawn off the liquid surface of a basin with the help of a conveyor system and discharged through a discharge pipe. The conveyor system is formed by a worm conveyor (FIG. 4) located in a semi-cylindrical channel. The overflow channel is located above the level of the flocculated layer. The floating layer is lifted by a paddle wheel above the overflow channel, thereby mixing the floating layer mass and the liquid, which lowers the quality of the separation.

Also known are tiltable channels wherein the height of the overflow edge can be adjusted in such a way that the floating mud can be removed by lowing the overflow edge. The overflow edge is here lowered uniformly across its entire length which disadvantageously causes the floating mud particles to be mixed non-uniformly with the underlying liquid when reaching the discharge channel. This results in a poor separation between the floating layer and the underlying liquid. Moreover, this device cannot be adapted at all, or only in a limited way, to strongly varying liquid levels.

Other known arrangements use revolving chain drives and laterally disposed scum boards to separate the floating mud, wherein the floating layer mass collects in front of the scum boards. The floating layer mass is transported sideways to a pump container by paddles mounted on the chain drives and is drawn out of the pump container. The moving drive elements may experience excessive wear and corrosion which makes this arrangement expensive to manufacture and to maintain, reducing its overall cost-effectiveness. Moreover, with this arrangement, the inflow is disadvantageously restricted to only one side.

Other arrangements for separating floating mud used with circular basins include a first floating mud barrier, with a second floating mud barrier positioned in front of the first floating mud barrier. The second floating mud barrier is periodically moved towards the first floating mud barrier, so that the space between the first and the second mud barriers forms a channel. In the position where the first and second mud barriers form the channel, individual paddles drive the floating mud to the transport discharge region. These arrangements have also the disadvantage of high manufacturing and maintenance costs, and inflow is restricted to only one side.

Also known are rotatably driven discharge ducts with slots and paddles which allow floating mud to enter the slots depending on the rotational motion. These arrangements, however, are disadvantageously much less precise for separating the floating matter and the harmful clarified water fraction because the distribution of the floating matter across the entire width of the inlet is not properly taken into account.

Finally, another arrangement uses discharge channels for the floating mud, which have sloping inlet planes before the inlet edges and crank mechanisms with strip-like brushes to swipe the floating layer into the channel. Disadvantageously, these arrangements operate only over short distances and over a limited range of liquid levels, and inflow is restricted to one side.

All of the aforedescribed arrangements have the additional disadvantage that floating matter can accumulate heavily in certain areas and can permanently dry in areas that are not adequately wetted. Any cleaning required reduces the up-time of the machine.

SUMMARY OF THE INVENTION

It is thus an object of the present invention to provide an improved device of the aforedescribed type, obviating the afore-stated drawbacks.

In particular, it is an object of the present invention to provide an improved device of the aforedescribed type which can be used to separate floating mud independent of the height of the respective liquid level in the basin.

It is still another object of the present invention to carefully transport the floating layer mass and to separate the floating layer mass from the underlying liquid independent of the amount of floating matter disposed across the length of the transport discharge device.

It is yet another object of the invention to have the floating mud enter the device from both sides so that adverse effects due, for example, wind pressure in a circular settling basin, are eliminated.

It is still another object to provide a device for separating the floating layer masses produced in treatment plants, wherein the floating layers may have a height of up to 10 cm.

It is yet another object to separate the floating layer mass fully automatically and with high quality, and to make it unnecessary to supervise the operation.

These objects, and others which will become apparent hereinafter, are attained in accordance with the present invention by forming the transport device of at least one displacement body which is arranged in the region of the liquid surface and is driven by a drive unit, wherein the displacement body moves the floating layer mass on the liquid surface towards the transport discharge region.

Because the transport device is designed as a displacement body, the floating layer mass can be effectively transported to a transport discharge region without causing variations in the entrained floating layer mass.

The device of the invention provides the additional advantage that floating layer masses which form behind the scraper booms due to wind pressure, can be collected with the back side of the inventive device and transported to a pump sump. The drive unit may be formed by a motor, e.g. an electric motor, or by other suitable drive means.

According to another embodiment of the invention, the displacement body may be rotatably supported for rotation about its longitudinal axis. The transport motion created by the rotation about the longitudinal axis enables an advantageous separation of the floating mass from the liquid.

According to yet another embodiment of the invention, the displacement body may be provided with a helical surface which is arranged on the displacement body and extends at least partially along the longitudinal axis, wherein the floating layer mass is transported in the axial direction towards the transport discharge region when the displacement body rotates. The helical surface disposed on the displacement of body drives the mud residing on the liquid surface through its helical motion along its longitudinal axis, thereby achieving a simple transport and separation motion.

According to still another feature of the invention, the transport discharge region may be formed by an overflow edge disposed on an end face of the displacement body. With this arrangement, the movement of the overflow edge can follow the liquid surface level, so that a correct overflow height difference is always maintained. This movement can be achieved in different ways, in particular by directly mechanically coupling the floating body.

According to another embodiment of the invention, at least one displacement body may be formed as a floating body which is driven by the drive unit that is positioned independently of the respective liquid level in the basin, with the floating body floatingly rotating on the liquid surface. The displacement volume of the floating body according to the invention is selected so that sufficient buoyancy in the liquid of the basin is provided to ensure that the floating body is always floating. The floating body always floats on the liquid surface by adjusting automatically to different liquid levels. The inventive device transports the floating layer mass continuously in the direction towards the transport discharge region so that the mud can be pumped out. The support points of the floating displacement body which are connected to the drive advantageously do not need to support vertical forces. The horizontal forces, on the other hand, are minimal so that the support points experience only insignificant wear or no wear at all. As a result, the device operates extremely reliable and requires little maintenance, which is advantageous in particular in a fully automatic operation. This is also important since existing devices of this type frequently malfunction and are expensive to maintain and are therefore less effective.

According to a particularly advantageous embodiment, the difference in height between the overflow edge and the liquid surface is maintained constant independent of the respective liquid level in the basin.

According to another embodiment of the invention, the floating body may be coupled to a device circulating in the liquid basin, such as a rotating scraper bridge located in a circular final sedimentation tank. The floating body then moves in a circular path in conjunction with the circulating device in addition to performing a rotational motion. With this arrangement, the inventive device moves together with the rotating scraper bridge and collects the accumulating mud and transports the mud to a pump basin.

According to yet another embodiment of the invention, the displacement body may be stationarily supported in a basin at the height of the liquid level by a linearly moving device, such as a chain scraper with a scraper boom, wherein the scraper booms continuously moves the floating mud on the liquid surface towards the displacement body. The displacement body moves the inflowing floating mass continuously normal to the direction of motion of the scraper boom and across the overflow edge. The conventional transport of suspended mud with a chain scraper cans thus advantageously be employed to also transport to the material floating on the liquid surface.

According to still another embodiment of the invention, the displacement body may be formed by a pipe which is closed off at its respective ends. Bearing supports project from the respective ends, and a helical surface is arranged about the circumference of the pipe. The inventive displacement body can thus have a very simple design. The helical surface, however, can also be constructed in other ways, as long as the floating layer is transported along the longitudinal axis of the floating body when the floating body rotates.

According to another embodiment of the invention, the helical surface may be formed of one or several bands that are formed about the circumference of the pipe. The transport process becomes thereby very reliable and can be performed fully automatically, since this particular design of the helical surface can transport even very thick floating layers without clogging or disabling the helical surfaces.

According to still another embodiment of the invention, the band(s) is (are) composed of a plurality of band sections which are spaced apart along the helical surface. Such a helical surface is particularly advantageous with floating layers having little mobility, since the band section simultaneously comminute the floating masses. Blocks of mud that adhere to each other can then more easily be moved in the direction of the helix.

According to yet another embodiment of the invention, the ratio of the outer diameter of the helical surface to the core diameter may be in the range of between 2 and 10. With this ratio, the floating mud slides off the helical surfaces, thereby preventing the floating mass from circulating or mixing unintentionally.

According to another embodiment of the invention, accumulated floating mud can be better moved along the transport direction by increasing the pitch of the helical surface towards the transport discharge region. In addition, the helical surface may have an outer diameter that is different over the length of the displacement body, so that the displacement body can traverse obstacles in the basin and/or adapt to a locally varying volume of floating layer mass.

According to yet another embodiment of the invention, the ends of the floating body may be rotatably supported by vertically displaceable sliding bearing elements, so that the floating body can move unobstructedly in the vertical direction. The floating body can thereby also automatically adapt to the respective liquid level. Preferably, the sliding bearing elements may be arranged in vertical guide rails which are either disposed on the rotating system or are stationary in the liquid basin. The floating body can thereby be secured in its vertically adjustable position without affecting its rotation.

In order to effectively and continuously adjust the overflow edge to the respective liquid level, another embodiment of the invention provides that the floating body is connected to one of the two front bearings through the vertically displaceable overflow separation wall. The difference in height, which is caused by the vertical movement of the floating body due to changes in the liquid level, between the liquid surface and the overflow edge which is formed on the overflow separation wall, is then constant.

Moreover, two preferably opposite overflow separation walls of the pump basin may be connected to a respective one of the two end faces of a one of the two floating bodies. With his arrangement, the pump basin can be centrally located and the floating mud can be transported into the pump basin from two sides.

In large circular basin, the floating layers are driven mainly by wind forces, causing the floating layers to accumulate mainly along the circumference of the basin and in front of circulating obstacles. According to a particularly advantageous embodiment of the invention, at least one of the displacement bodies performs a helical motion which transports the floating mud radially outwardly with respect to the center of the liquid basin. In this way, the floating mud can be transported, for example, to a pump sump that moves along with a scraper bridge.

If the floating body is not entirely sealed, the profile can still be prevented from becoming submerged by filling the floating body with a filler material that has closed pores and is able to float permanently, for example polyurethane foam. Moreover, the floating body may be connected to the drive unit through a drive shaft, preferably a universal joint, a helical spring or a corrugated hose made of an elastomer material. In this way, height differences between the rigid motor drive shaft and the center of the floating body can be compensated.

According to still another embodiment of the invention, two or more displacement bodies may be formed which are joined with each other nonrotatably at their respective end faces, wherein the non-rotatable connection is preferably articulated and/or elastic. With his arrangement, large transport lengths can be attained without the need for precise manufacturing tolerances.

According to yet another embodiment of the invention, the floating mud may be transported from two sides by providing two or more displacement bodies which are joined with each other non-rotatably at their respective end faces and have helical surfaces working in opposite directions. The helical surfaces transport the floating mud to an overflow edge disposed at the connection point, wherein each of the free ends of the floating body is connected to a respective drive unit. This arrangement prevents unilaterally acting forces from tilting the floating body. The overflow edge can be moved in response to the liquid level without significant friction by using bellows which exhibits practically no resistance against displacement.

According to another embodiment of the invention, the drive unit of the floating bodies may be controlled by turbidity sensors disposed in the region of the overflow edge. In this way, the device can be adjusted depending on the actual requirements, i.e. when the accumulated floating layer mass has caused the liquid in the vicinity of the overflow edge to become turbid.

According to another aspect of the invention, in a device for separating a floating layer mass, such as mud, foam and the like, from a liquid residing in a liquid basin, e.g., a settling basin, and carrying the floating layer, wherein the device includes a transport device which moves the floating layer through a rotational motion to a transport discharge region, there may be provided that the at least one rotating displacement body for transporting the floating layer mass is located in the region of the liquid surface of the liquid basin, wherein the at least one displacement body moves the floating layer mass which is in a contact with the displacement body, on the liquid surface of the liquid basin towards the transport discharge region.

BRIEF DESCRIPTION OF THE DRAWING

The above and other objects, features and advantages of the present invention will now be described in more detail with reference to the accompanying drawing, in which:

FIGS. 5, 6, 7 each show a plan view of another embodiment of the device according to the invention;

FIGS. 8a and 8b show a plan view and a sectional view of another embodiment of the device according to the invention;

FIGS. 9 and 10 each show a side view of a displacement body with a helical surface of an embodiment of the device according to the invention.

DETAILED DESCRIPTION OF PREFERRED EMBODIMENTS

Figure 1:
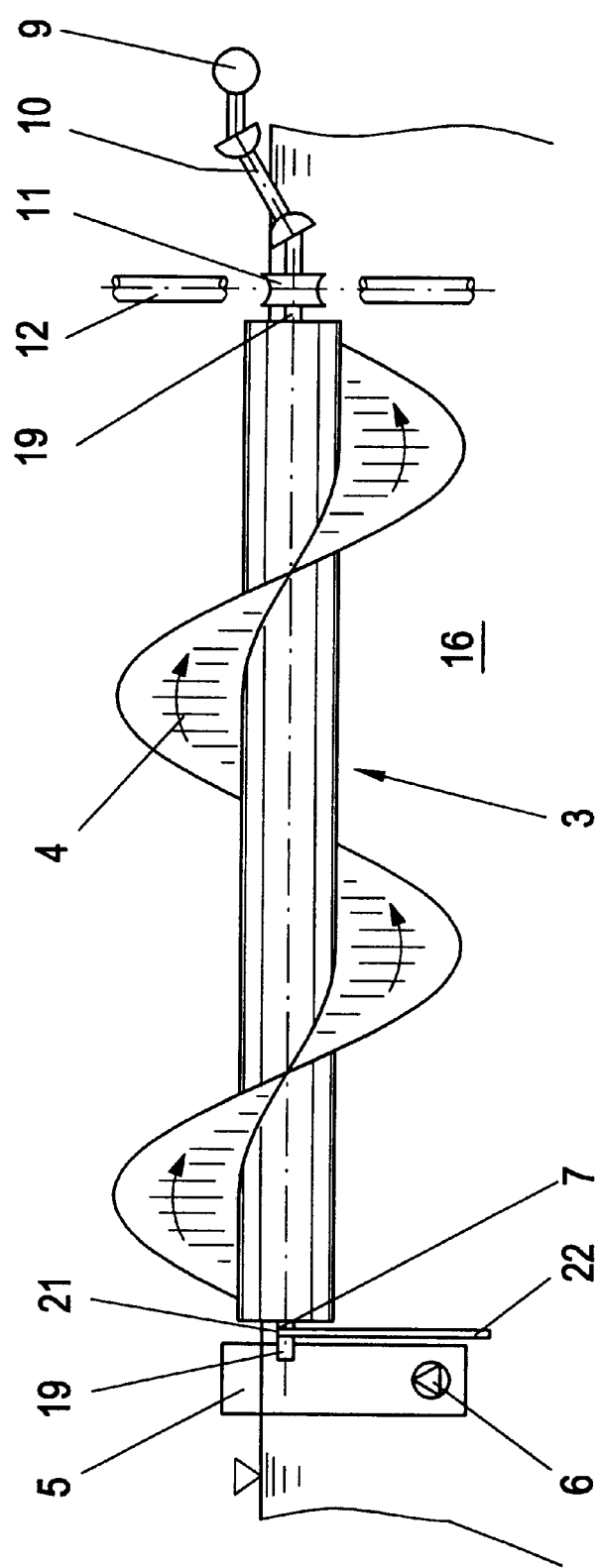
FIG. 1 is a sectional view of a first embodiment of a device according to the invention.
Figure 2:
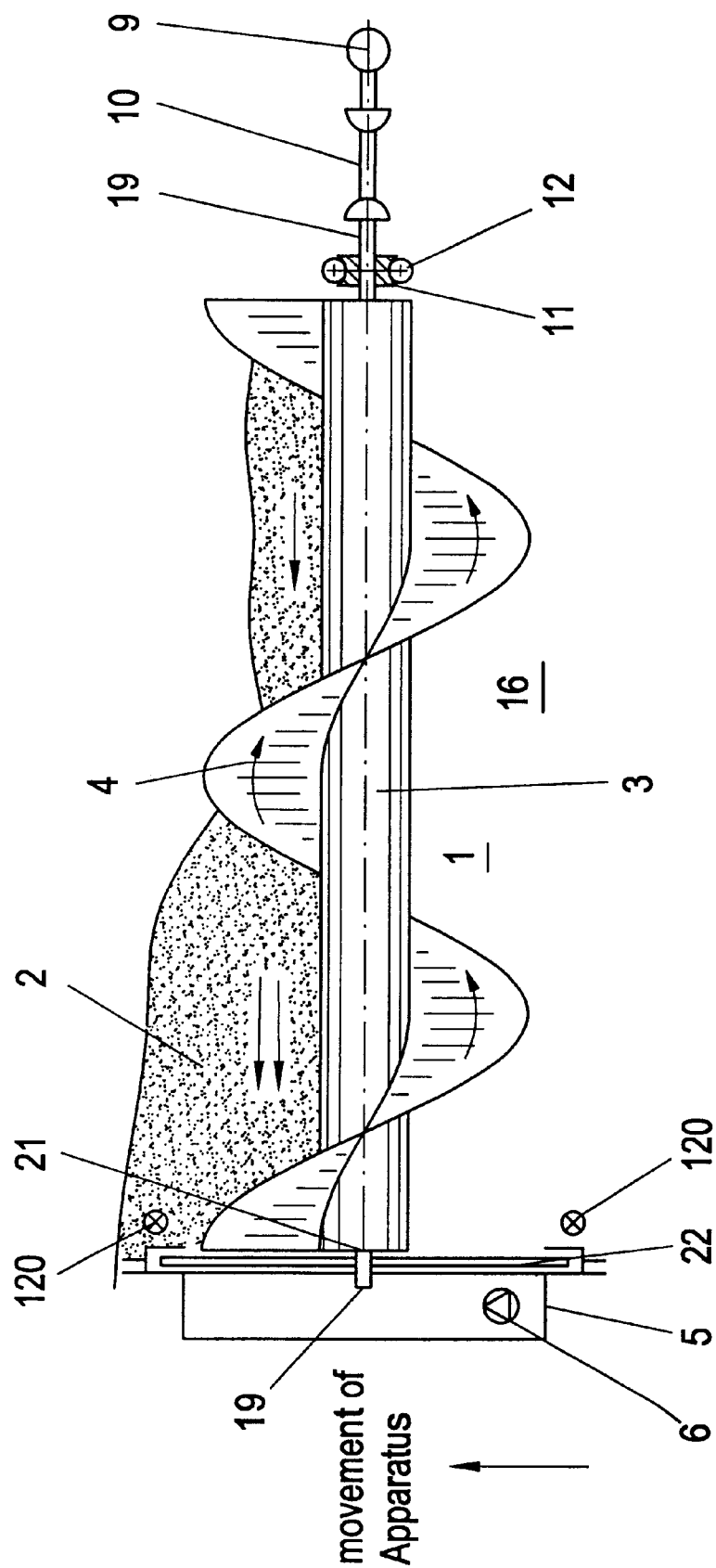
FIG. 2 is a plan view of the device according to FIG. 1.
Figure 3:
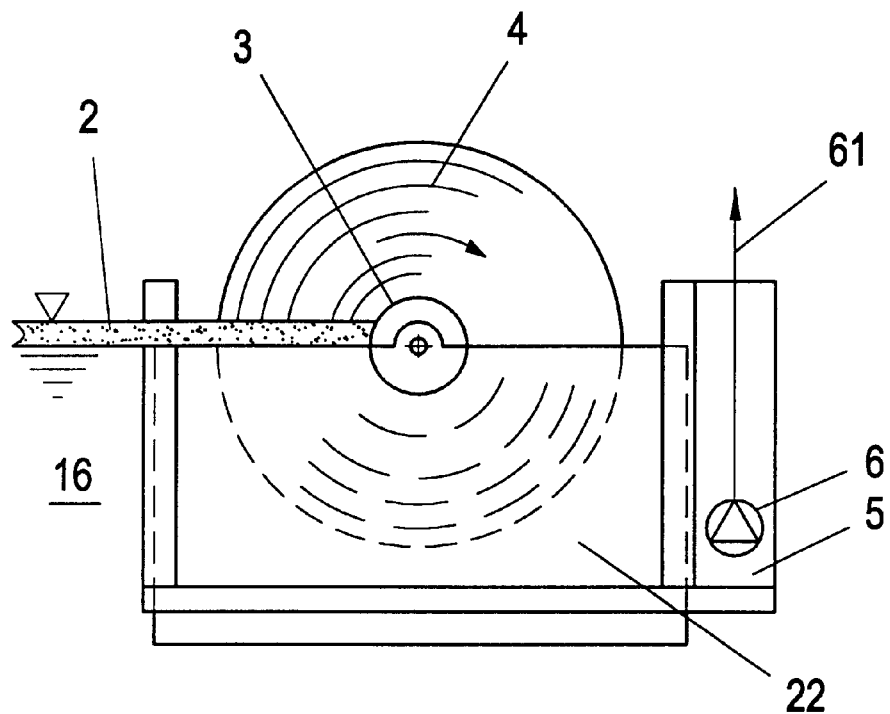
FIG. 3 is a side view of the device according to FIG. 1 as viewed from the pump basin.

FIGS. 1 to 3 show a settling basin 16 holding a liquid 1 and a floating layer 2 disposed on the liquid. A device adapted to separate the floating layer mass from the liquid separates the floating material with the help of a rotatably supportive transport device 3 which moves the floating layer mass to a transport discharge region. In the present example, the transport discharge region is a pump basin 5 which includes an overflow edge 7 and a submersible pump 6 for removing the mixture of floating material and liquid through the discharge line 61. The invention can be used with different forms of liquid basins and different types of liquids. In the illustrated example, the floating mud produced during the treatment process is a separated on the liquid surface. The invention, however, can also used for other substances floating on different types of liquids.

According to the invention, the transport device is formed of a displacement body 3. According to the embodiment illustrated in FIG. 1, the device transporting the mud is formed by a displacement body 3 which is capable of rotating about its longitudinal axis and has disposed thereon a helical surface 4 extending along the longitudinal axis. The exemplary displacement body is constructed so as to form a floating body 3, meaning that the displaced volume causes the displacement body to float on the liquid surface, so that the floating body 3 follows changes in the liquid level of the basin without requiring additional means. A drive unit in form of an electric motor 9 causes the floating body 3 and the helical surface 4 to rotate about the longitudinal axis. The driving force is transmitted from the motor 9 to the floating body 3 by a universal joint 10 which allows the device to operate independent of the respective liquid level in the basin. Other mechanical means, such as a coil spring or a corrugated hose made of elastomer material, can also be used as a mechanical coupling.

In order to enable a vertical movement of the floating body in response to level variations without affecting the rotation of the floating body, the drive side of the floating body is rotatably supported in a sliding bearing. The floating layer mass is here transported to the overflow edge 7 located at the end face of the floating body 3 by the rotation of the helical surface 4 in the axial direction. The mud is moved into the pump basin 5 across the overflow edge 7. The difference in height between the overflow edge and the liquid surface is maintained constant independent of the respective liquid level in the basin 16, so that the correct overflow height is always maintained.

The floating body 3 itself is formed of a pipe that is closed off at its respective ends, with the support stubs 19 attached to the ends. The helical surface which is formed as a band 4 about the circumference of the pipe, extends between the two support stubs 19. The helical surface according to the invention can be constructed in other ways as long as the helical surfaces move the floating mud on the liquid surface when the displacement body rotates. The transport direction depends on the orientation of the helix. The helical surfaces can also be formed of several bands, or the band 4 can be composed of a plurality of spaced apart band sections disposed along the helical surface.

It a particularly advantageous embodiment, the ratio of the outer diameter of the helical surface to the core diameter is in the range of between 2 and 10. For a floating displacement body, the ratio has to be selected so as to provide the required buoyancy and may therefore have a limited range of values. For example, with an outer diameter of the helical surface of 1000 mm and a core diameter of 250 mm and a wall thickness of 2 mm, the immersion depth will be equal to the core diameter, resulting in a particularly high transport efficiency of the floating mass.

If the displacement body is supported at a fixed position, then the ratio of outer diameter to the core diameter of the helical surface can be arbitrarily selected.

The slope of the helical surface of the aforedescribed embodiment is significantly flatter in the region of the core diameter than in the region of the outer diameter. It is therefore not very informative to give the value of the pitch relative to the difference in a linear position during one revolution. The helical surface, however, should have at least a pitch which ensures that the floating mass slides off the helical surface during the rotation, so that the floating mass does not accumulate. In the present embodiment, this would require a pitch equal to approximately the outer diameter, i.e. 1000 mm. As determined by experimentation, the preferred pitch is in the range of 20% to 200% as referred to the outer diameter of the helical surface. The values ensure a particularly efficient transport of the floating mud. Other pitch values outside the indicated range may also be used for the inventive device. For particularly thick floating masses, the pitch of the helical surface should advantageously increase towards the transport discharge region. This design takes into consideration the typically observed volume increase of the transported floating mass near the transport discharge region, so that the masses can be moved without significant friction.

It is also important that the rotation speed of the device according to the invention is not too high. The selected rotation speed at the outermost boundaries of the helical surface should not be higher than the upward velocity of the floating matter in the liquid. Otherwise, if the rotation speed were higher, floating masses on the downstream side of the helical surface would be pushed into the liquid, thereby again mixing the liquid with floating mud.

The direction of rotation of the helical surface is selected so that the helical surface moves the floating mass upwardly to the transport discharge region. In other words, the helical surface on the upstream side where most of the floating mass accumulates, should move with an upward slope relative to the liquid surface.

The drive side of the support stubs 19 is rotatably supported in a vertically displaceable sliding support block 11, whereas the side of the overflow edge 7 is rotatably supported in another bearing 21. The other bearing is connected to a vertically displaceable overflow separation wall 22 of the pump basin 5, so that the height difference between the liquid surface and the overflow edge formed on the overflow separation wall remains constant when the floating body moves vertically in response to changes in the liquid level. As a result, the buoyancy of the liquid 1 causes the floating body 3 to pull the separation wall 22 with the overflow edge 7 automatically into the proper position. Alternatively, the level of the separation wall can be independently adjusted by an automatic, for example motor driven, control. The sliding support block 11 is arranged in vertical guide rails or profiles 12 at a fixed location in the liquid basin.

Figure 4:
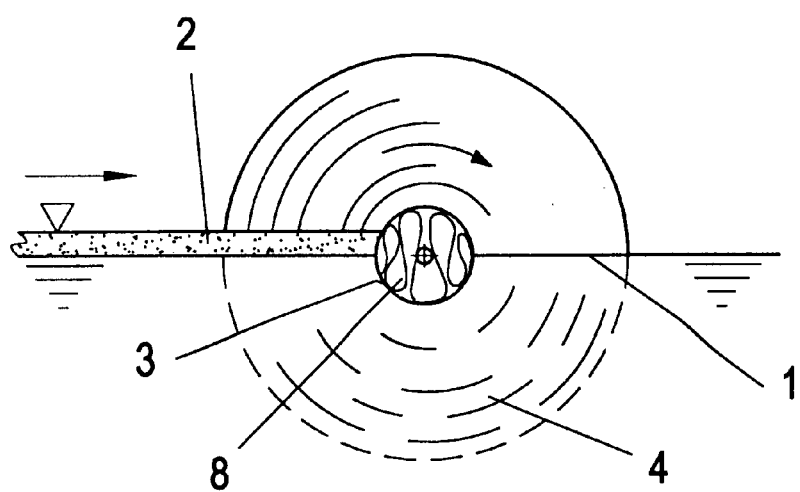
FIG. 4 is a section through another embodiment of the device according to the invention.

To maintain the buoyancy of the floating body in the event of a leak in the pipe 3, the floating body is filled with a filler mass 8, e.g. polyurethane foam, having closed pores for permanent flotation, as illustrated in FIG. 4. However, other suitable materials or gases can also be used.

FIG. 4 illustrates an embodiment of the invention wherein the floating body 3 is coupled to a device circulating in the liquid basin. The device in this example is formed by a scraper bridge 44 circulating about a center structure 14 of a circular final sedimentation tank 16'. The floating body not only rotates, but also performs a circular motion together with the circulating device in the liquid basin 16'. The floating body 3 may be supported, as in the arrangement shown in FIGS. 1 and 2, by sliding support blocks, with the vertical guide rails secured to the circulating device. The at least one floating body 3 executes a helical motion which transports the floating mud radially outwardly with respect to the center of the liquid basin. Guide plates 15 feed the floating mud to the helical surfaces of the floating body 3 from areas of the basin 16' which the floating body 3 cannot reach.

FIG. 8*a* and FIG. 8*b* illustrate another embodiment of the invention wherein a displacement body 31 is not dimensioned as a floating body, but instead is stationarily supported in a rectangular basin 16" having a linear revolving chain scraper 46. Basins of this type are frequently used in sewage treatment plants. The revolving chain scraper 46 with scraper boom 45 moves sedimentation mud 47 located near the bottom of the basin into a funnel 48 (FIG. 8*b*) and alternatingly transports the floating mass 2 on the liquid surface towards the inventive device 31. Because in such basin the variations in the liquid level fall within certain boundary values, the inventive device 31 does not have to move continuously in response to changes in the liquid level and can therefore be provided with stationary bearings. When the scraper boom on thee liquid surface moves the floating mud towards the displacement body, the displacement body moves the inflowing floating mass continuously across the over flow edge 7 in a direction normal to the movement of the scraper boom. Embodiments of the floating body can also be used with stationary bearings, if the liquid level in the basin exhibits only small variations.

FIG. 6 shows another embodiment of the invention, wherein the floating mud is transported from two sides. In this case, two opposite overflow separation walls 22 of the pump basin 5 are connected to a respective one of the two end faces of the floating bodies 3', 3" which have helical surfaces with opposite sense.

To manufacture very long transport devices, two or more displacement bodies having helical surfaces with the same sense can be joined with each other non-rotatably at their respective end faces, wherein the non-rotatable connection 15 is preferably articulated and/or elastic.

According to another embodiment of the invention (not shown), two floating bodies which are non-rotatably connected to each other at their respective end faces in an articulated manner, have helical surfaces with opposite sense. The floating bodies are driven by a common motor. The helical surfaces transport the floating mud to an overflow edge located at the connection point between the two floating bodies.

Figure 11A:
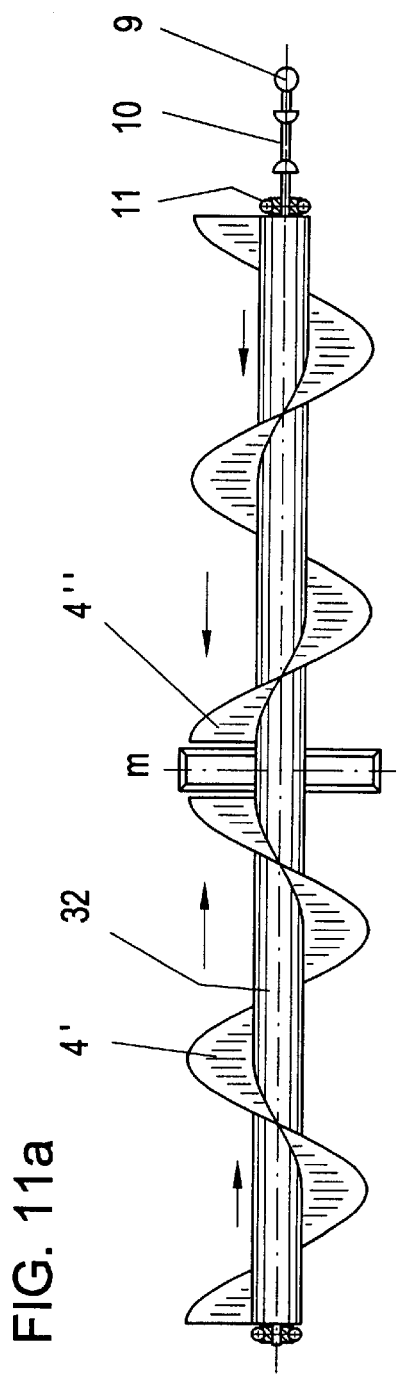
FIGS. 11a and 11b show a plan view and a sectional view of another embodiment of the device according to the invention.
Figure 11B:
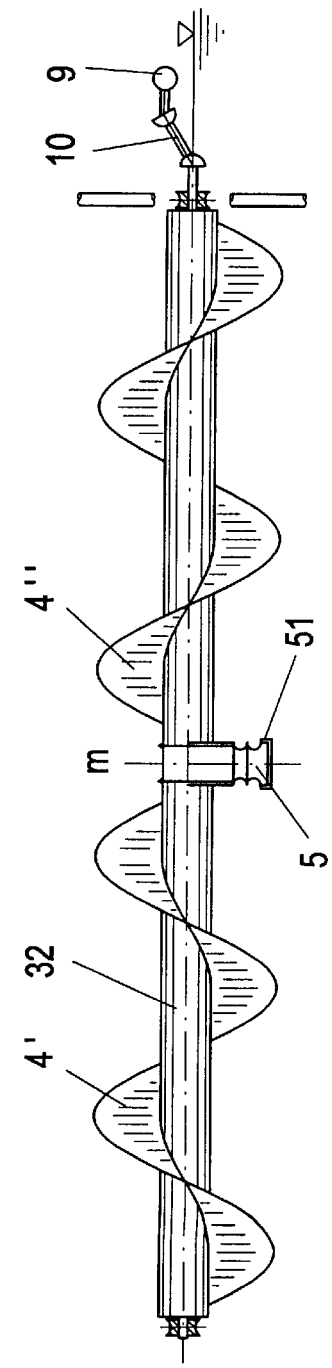

FIG. 11*a* and FIG. 11*b* show a floating body 32 with perfectly symmetrical helical surfaces 4', 4" which are oriented relative to each other with the opposite sense. The helical surfaces 4', 4" are symmetric with respect to a mirror plane m located half-way along the length of the floating body and extending perpendicular to the longitudinal axis of the floating body. The helical surfaces 4', 4" discharge in the region of the mirror plane m into a pump basin 5 which is connected to the displacement body 32 through a bellow 51 allowing for vertical movement. With this design, no unilateral forces are applied to the floating body which may otherwise tilt the floating body.

It will be under stood that slider mechanisms, such as the mechanism shown in the embodiment of FIG. 6, create friction forces which can impair the operation of the floating body. By using bellows similar to those illustrated in FIGS. 11*a* and 11*b*, which are installed in both the axial and the transverse direction, the resulting forces are approximately in equilibrium. Consequently, only small differences in the force applied in the vertical direction, which result from differences in the liquid pressure on the bellows located at different heights, have to be guided. Conversely, with a slider design, the actuating forces depend on the liquid level on the inlet side, the degree of contamination and the friction coefficient between the slider and the rigid container. Moreover, contamination degrades the operation more severely with sliders than with bellows which are surrounded by liquid. Bellows show essentially no resistance against displacement.

The embodiment according to FIG. 9 and FIG. 10 shows a helical surface with an outer diameter that varies along the length of the displacement body 3. In the embodiment of FIG. 9, an obstacle 56 located in the basin can be negotiated, which makes the inventive device more useful under actual operating conditions. The embodiment of FIG. 10 also helps to increase the feed rate, for example in the longitudinal direction of the displacement body.

To match the transported quantity of mud to the actual requirements, the drive unit of the floating body 3 can be controlled by turbidity sensors 12 located in the region of the overflow edge, as shown in FIG. 2. It this way, the inventive device can be automatically switched on as soon as the mud layer exceeds a predetermined thickness which is proportional to the measured turbidity.

While the invention has been illustrated and described as embodied in a DEVICE FOR SEPARATING FLOATING LAYERS IN A LIQUID BASIN, it is not intended to be limited to the details shown since various modifications and structural changes may be made without departing in any way from the spirit of the present invention.

What is claimed as new and desired to be protected by Letters Patent is set forth in the appended claims:

1. A device for separating a floating layer mass from a liquid which resides in a liquid basin and carries the floating layer, wherein the device includes a transport device having a drive unit and at least one displacement body which is operated by the drive unit and positioned in the area of the liquid surface, said displacement body having a helical surface so that a rotation of the displacement body results in a transport of the floating layer mass upon the liquid surface towards a transport discharge device for the floating layer mass, with the transport discharge device having an overflow edge adjacent the displacement body, said displacement body configured as a floating body so as to floatingly rotate on the liquid surface, wherein the floating body is operatively connected to the drive unit as to remain floating on the liquid surface when the liquid level in the liquid basing changes.

2. The device according to claim 1, wherein the displacement body is rotatably supported for rotation about its longitudinal axis, said overflow edge being disposed on an end face of the displacement body.

3. The device according to claim 2, wherein the helical surface on the displacement body extends at least partially along the longitudinal axis, wherein the floating layer mass is transported in the axial direction towards the transport discharge device upon rotation of the displacement body.

4. The device according to claim 1, wherein the difference in height between the overflow edge and the liquid surface is constant independent of the respective liquid level in the liquid basin.

5. The device according to claim 1, wherein the displacement body is coupled to a device circulating in the liquid basin, so that the displacement body moves in a circular path together with the circulating device in addition to performing a floating rotational motion.

6. The device according to claim 1, wherein the displacement body includes a pipe having closed ends connected to bearing supports, and a helical surface arranged about the circumference of the pipe.

7. The device according to claim 6, wherein the helical surface is configured by at least one band formed about the circumference of the pipe.

8. The device according to claim 7, wherein the band is composed of a plurality of band sections arranged in a spaced apart fashion along the helical surface.

9. The device according to claim 1, wherein the ratio of an outer diameter of the helical surface to a core diameter of the displacement body is in the range of between 2 and 10.

10. The device according to claim 1, wherein the helical surface has a pitch in the range of 20% to 200% with respect to an outer diameter of the helical surface.

11. The device according to claim 1, wherein the helical surface has a pitch which increases towards the transport discharge device.

12. The device according to claim 1, wherein the helical surface has an outer diameter that is different over the length of the displacement body.

13. The device according to claim 1, wherein the displacement body is rotatably supported at its ends by vertically displaceable sliding bearing elements.

14. The device according to claim 13, wherein the displacement body is coupled to a device circulating in the liquid basin, so that the displacement body moves in a circular path together with the circulating device in addition to performing a floating rotational motion the, said sliding bearing elements arranged in vertical guide rails disposed either on the circulating device or stationary in the liquid basin.

15. The device according to claim 1, wherein the displacement body has a bearing for connection to a vertically displaceable overflow separation wall which forms the overflow edge so that a difference in height between the liquid surface and the overflow edge is constant regardless of changes in the liquid level in the liquid basin as a result of vertical movements of the displacement body.

16. The device according to claim 15, wherein the transport discharge device is a pump basin having two of said overflow separation wall connected to a respective one of confronting ends of one of two of said displacement body.

17. The device according to claim 16, wherein the two separation walls confront one another.

18. The device according to claim 1, wherein the at least one displacement body performs a helical motion which transports the floating layer mass radially outwardly with respect to a center of the liquid basin.

19. The device according to claim 1, wherein the displacement body is filled with a filler material that has closed pores and is able to float permanently.

20. The device according to claim 19, wherein filler material is polyurethane foam.

21. The device according to claim 1, wherein the displacement body is connected to the drive unit through one of a drive shaft, a helical spring and a corrugated hose made of an elastomer material.

22. The device according to claim 21, wherein the drive shaft is a universal shaft.

23. The device according to claim 1, wherein two or more of said displacement body are joined with each other at their respective end faces in a fixed rotative engagement.

24. The device according to claim 23, wherein the fixed rotative engagement is articulated or elastic.

25. The device according to claim 1, wherein two or more of said displacement body are pivoted in fixed rotative engagement with each other at their respective end faces and formed with helical surfaces working in opposite directions, said helical surfaces transporting the floating layer to an overflow edge disposed at the point of connection of the displacement bodies, wherein each of the free ends of the displacement body is connected to a one of said drive unit.

26. The device according to claim 1, wherein the displacement body includes two helical surfaces extending thereon in symmetric relation with respect to a mirror plane located half-way along the length of the displacement body and extending perpendicular to the longitudinal axis of the displacement body, wherein the helical surfaces terminate in the region of the mirror plane via the overflow edge which is connected through a bellow to the displacement body for vertical movement.

27. The device according to claim 1, wherein the drive unit of the displacement body is controlled by turbidity sensors disposed in the region of the overflow edge.

28. A device for separating a floating layer mass from a liquid residing in a liquid basin and carrying the floating layer, comprising: a transport device, a drive unit, a rotating scraper bridge acting as a circulation device, said transport device is formed of at least one displacement body which is arranged in the region of the liquid surface and driven by the drive unit, said drive unit occupying a position independent of the respective level of the basin; and wherein the at least one displacement body is formed as a floating body driven by the drive unit and moving the floating layer mass on the liquid surface towards the transport discharge region; and wherein at least one floating body is coupled to the rotating scraper bridge of a circular final sedimentation tank and floatingly rotates on the liquid surface so that the floating body moves in a circular path together with the circulating device in addition to performing a floating rotational motion.

29. A device for separating a floating layer mass from a liquid residing in a liquid basin and carrying the floating layer, comprising: a transport device, a drive unit, front bearings and a vertically displaceable overflow separation wall, said transport device is formed of at least one displacement body which is arranged in the region of the liquid surface and driven by the drive unit, said drive unit occupying a position independent of the respective level of the basin; and wherein the at least one displacement body is formed as a floating body driven by the drive unit and moving the floating layer mass on the liquid surface towards the transport discharge region which is formed by an overflow edge; and wherein one of the front bearings is disposed at the at least one floating body through the overflow separation wall, and wherein a difference in height caused by vertical movement of the floating body due to changes in the liquid level between the liquid surface and the overflow edge, is kept constant.

30. The device according to claim 29, wherein the transport discharge device is a pump basin having two of said overflow separation walls connected to a respective one of confronting ends of one of the said displacement body.

* * * * *